UNITED STATES PATENT OFFICE.

EMERICH MEISSL, OF VIENNA, AUSTRIA-HUNGARY.

PROCESS OF REFINING AND BLEACHING ANIMAL FATS.

SPECIFICATION forming part of Reissued Letters Patent No. 11,615, dated June 29, 1897.

Original No. 568,983, dated October 6, 1896. Application for reissue filed May 4, 1897. Serial No. 635,090.

*To all whom it may concern:*

Be it known that I, EMERICH MEISSL, a subject of the Emperor of Austria-Hungary, residing at Vienna, Austria-Hungary, have invented certain new and useful Improvements in the Process of Refining and Bleaching Animal Fats and Oils, of which the following is a specification.

The invention relates to an improved process of refining and bleaching animal fats and oils of that class which are composed, essentially, of saponifiable glycerides of the fatty acids, whereby they are freed from all discoloring and smelling matter and other impurities and obtained in a perfectly pure state and neutral taste and odor. For this purpose the animal fats and oils, preferably hog's fat, tallow, margarin, pressed tallow, goose-fat, and the like, are subjected to heat up to the melting-point and then mixed with the dry pulverized prussiate waste obtained in the manufacture of yellow prussiate of potash and then subjected to filtration, so as to separate the refined fat or oil from the impurities in a pure and inodorous condition. The residuum or waste which is used in my improved process is the insoluble solid residuum or waste resulting from the perfect lixiviation of the melted composition in the manufacture of yellow prussiate of potash, and which consists in general of silicates, lime, ferric and alumina compounds, carbon, and other insoluble matters. This residuum or waste is thoroughly washed, dried, and powdered. The greater or smaller effect of this residuum or waste on the animal or vegetable fats or oils to be refined and bleached depends on the chemical constituents contained in the residuum or waste.

The rationale of the effect of the residuum obtained in the manufacture of yellow prussiate of potash is based partly on chemical and partly on physical principles. The basic silicates contained in the residuum or waste bind the free fatty acids which cause the disagreeable smell and taste of animal or vegetable fats or oils, also the coloring-matters of an acid nature with which the discoloring and smelling substances form insoluble compounds and which are retained in the residue after the filtration of the melted fat and have to be removed from the same. The animal fats contain further products of fermentation of animal membranes, and these form, with the silicate, sulfate, and carbonate salts contained in the residuum or waste, likewise odorless and insoluble compounds which are retained during the filtration of the melted fat. The basic silicates, as well as the minutely-divided carbon contained in the prussiate waste, act further mechanically on the fats to be treated, inasmuch as the carbon particles are distributed minutely in the waste and absorb by their large surface, owing to the so-called "surface attraction," the substances by which the disagreeable smell and taste are produced, so that they are removed in this manner from the fat and oil in an analogous manner as the discoloration of sugar liquors by bone-black. The quantity of basic silicates of the alkalies of aluminium and calcium, as well as of the calcium carbonate and calcium sulfate contained in the prussiate waste, is of an essential influence on the animal fats in bleaching and refining the same. Consequently this waste cannot be replaced by bone-black or charcoal. The latter products do either not act at all on the animal fats or only slightly, so that large quantities of the same will be necessary, whereby the loss of fat would be too great. In addition thereto it is necessary to employ with bone-black or charcoal suitable solvents for the proper treatment of the fats. The prussiate waste acts already when using it in small quantities and without requiring any other additional solvent.

It is essential in the use of prussiate waste in the refining and bleaching fats that the temperature should under no circumstances rise beyond the melting-point of the same.

My improved process of refining and bleaching fats and oils is carried out as follows:

The melted animal fats or oils are first heated to melting temperature of the fats or oils to be treated, and freed as much as possible from the water contained in the same. The heated fat or oil is then mixed with from 0.1 to four per cent. by weight of the dry pulverized prussiate waste obtained as a residuum in the manufacture of yellow prussiate of potash and thoroughly stirred and then permitted to stand from five to twenty-five minutes in contact therewith.

The temperature to which the mixture is subjected, the quantity of prussiate waste added, and the duration of the time during which the waste is permitted to act on the fat or oil depends on the quality of the latter and the quantity and quality of the waste. For instance, in hog's fat, margarin, &c., the mixture has to be heated to a temperature of 180° to 200° Fahrenheit under addition of one-fourth to one-half per cent. of prussiate waste in case of hog's fats and one and one-half to two per cent. of prussiate waste in case of margarin. The time to which the mass is subjected to the action of prussiate waste is from ten to fifteen minutes. The mass is then subjected to filtration in a filter-press, percolator, or centrifugal apparatus, so that the refined fat or oil is separated from the impurities. During the filtering operation the temperature of the mass is maintained so that the filtrate is discharged at a temperature of 90° to 130° Fahrenheit. By the process described the fats and oils are purified from solid and liquid impurities, so that the fat or oil is perfectly clear, inodorous, and of neutral taste.

My process is applicable only to such animal fats or oils which consist mainly of saponifiable glycerides of the fatty acids, and is not applicable to wool fat and mineral oils and fats, and which can by my process be refined and bleached to such an extent that they are useful for food purposes and in the manufacture of soap and candles.

Having thus described my invention, I claim as new and desire to secure by Letters Patent—

The process herein described of refining and bleaching animal fats and oils composed essentially of saponifiable glycerides of the fatty acids, which consists in mixing the fat or oil at the melting temperature of the same with from 0.1 to four per cent. of the dry pulverized residuum or waste obtained in the manufacture of yellow prussiate of potash, permitting said waste to act on the fat or oil, and then subjecting the mass to a filtering operation while keeping the same in heated condition, substantially as set forth.

EMERICH MEISSL.

Witnesses:

JOHANN F. WOLFBAUER,

HUGO JORDAN.